United States Patent [19]

Barrett, Jr.

[11] 3,904,439
[45] Sept. 9, 1975

[54] SAFETY AND LOCKED SPARK PROOF BATTERY BOX

[76] Inventor: James H. Barrett, Jr., 3863 Surrey Rd., Toledo, Ohio 43615

[22] Filed: July 11, 1974

[21] Appl. No.: 487,778

[52] U.S. Cl. ............... 136/171; 136/181; 220/94 R; 220/91
[51] Int. Cl. ............................................ H01m 1/04
[58] Field of Search ........... 136/166, 171, 172, 181, 136/134 R; 220/94 R, 96, 91, 346

[56] References Cited
UNITED STATES PATENTS

| | | | |
|---|---|---|---|
| 968,606 | 8/1910 | Scharmann | 220/91 |
| 1,607,908 | 11/1926 | Nelson | 136/171 |
| 1,982,801 | 12/1934 | Gerking | 136/166 |
| 2,252,633 | 8/1941 | Jones et al. | 136/171 |
| 2,364,144 | 12/1944 | Hunsaker | 136/172 |
| 3,846,178 | 11/1974 | Evjen et al. | 136/166 |

OTHER PUBLICATIONS

The Exide–Powerclad Battery, Type TL-D, 1944, page 9.

Primary Examiner—Donald L. Walton

[57] ABSTRACT

A rectangular battery box, such as for a plurality of secondary cells of industrial batteries in a lift truck, having four side walls with a planar upper edge and a removable cover that covers the edge and may be hinged centrally of opposite sides of the box. A pair of lugs are movably attached to opposite sides of the box near its upper edge which when in the box operable position, expose above the top of the box grapple hook engaging apertures, and which in the locked box position expose smaller padlock engaging apertures. When the bails of padlocks are put through these smaller apertures, their bails engage the cover and prevent the lugs from being moved so the grapple hook apertures cannot be engaged and the box can be removed, insuring that only authorized personnel can replace the battery boxes. The walls of the battery box near the upper edge may be provided with apertures for the battery connector cables and/or the screen for the escape of the fumes from the batteries inside the box. The cover of the box may be lined on the inside with an insulation foam to prevent sparking between the terminals of cells of the batteries in the box.

13 Claims, 9 Drawing Figures

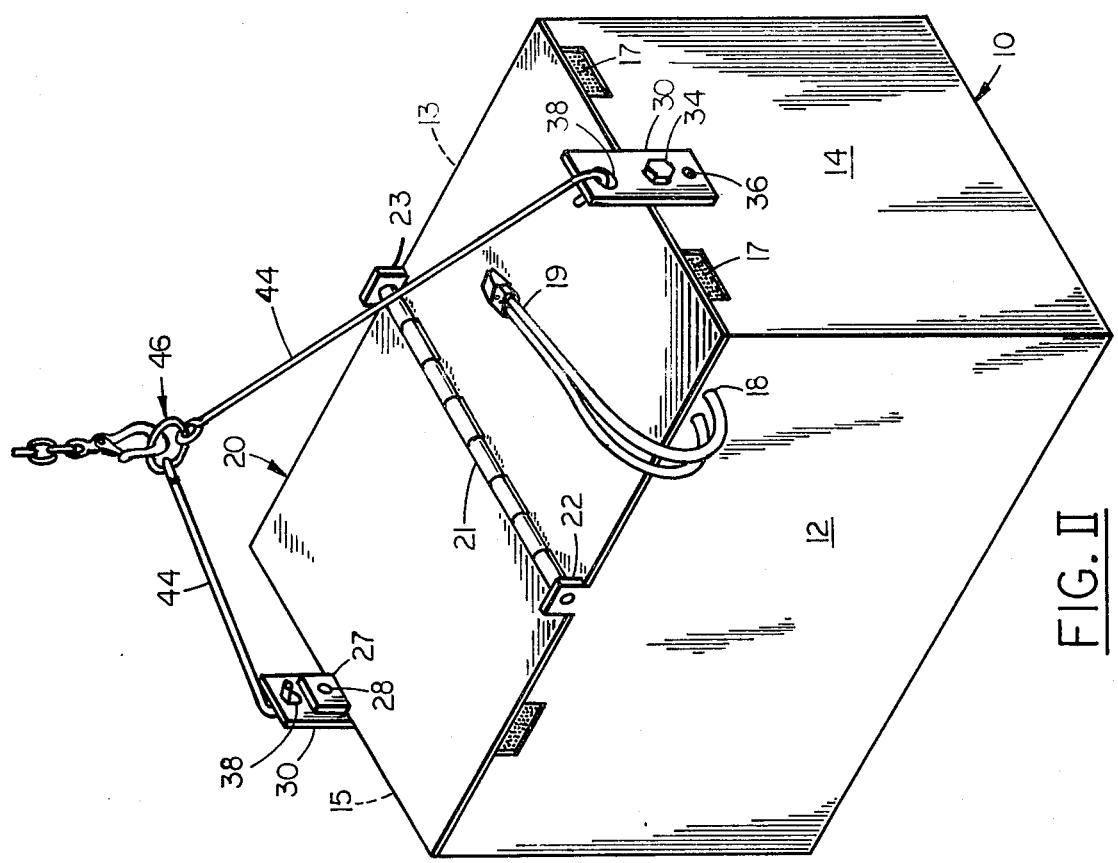
FIG. I
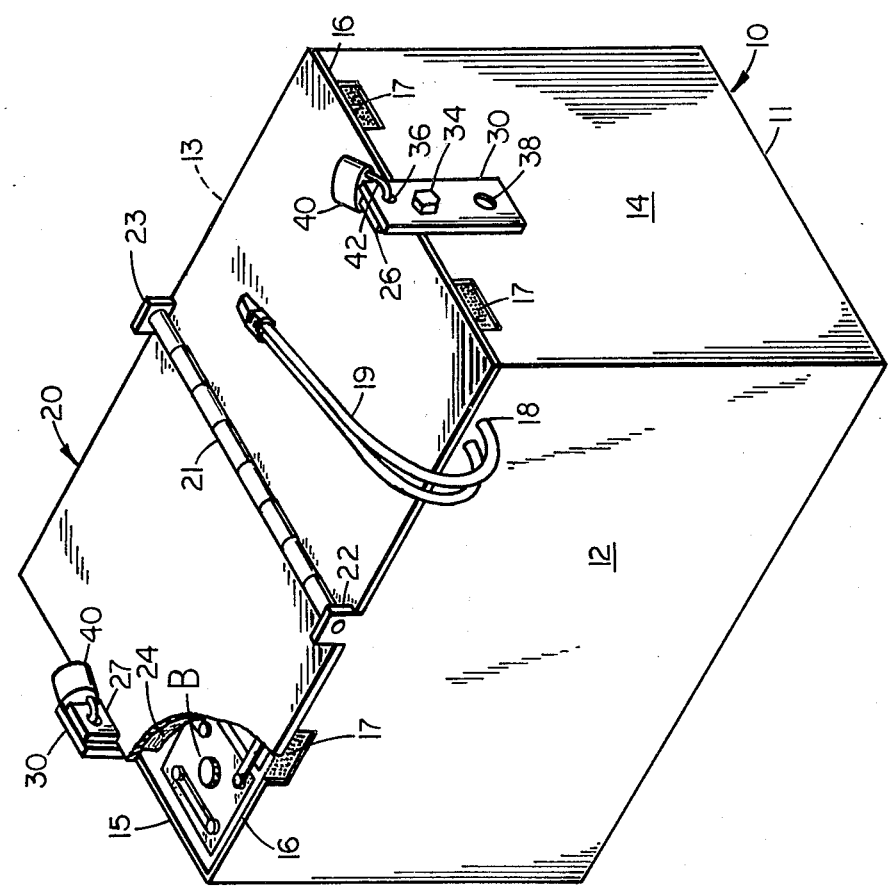
FIG. II

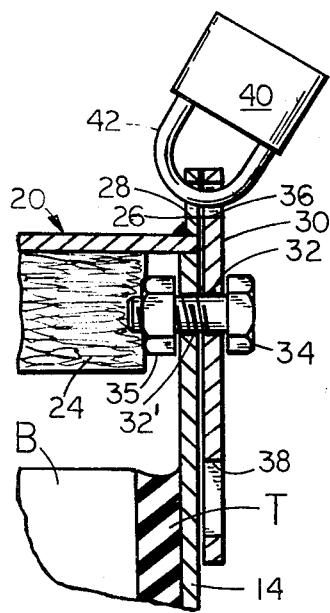
FIG. III
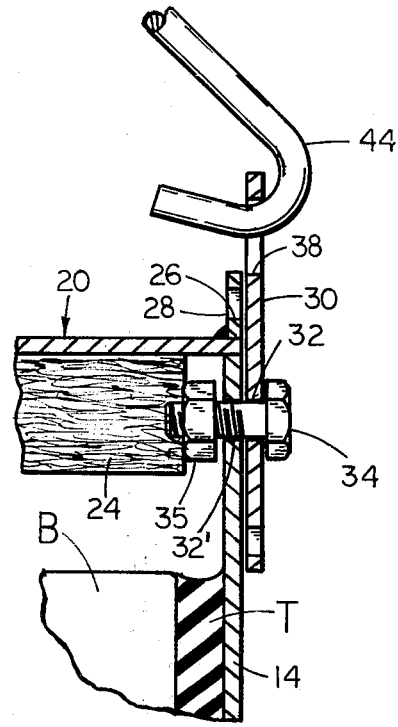
FIG. IV
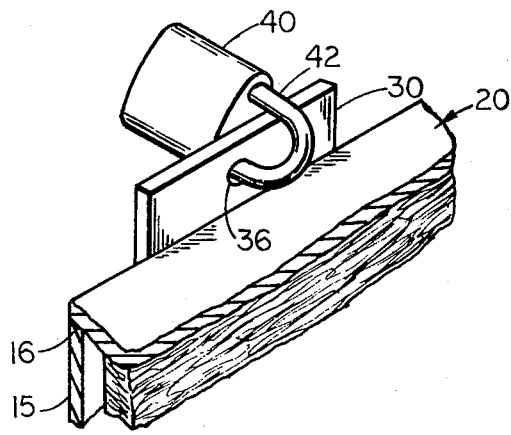
FIG. V
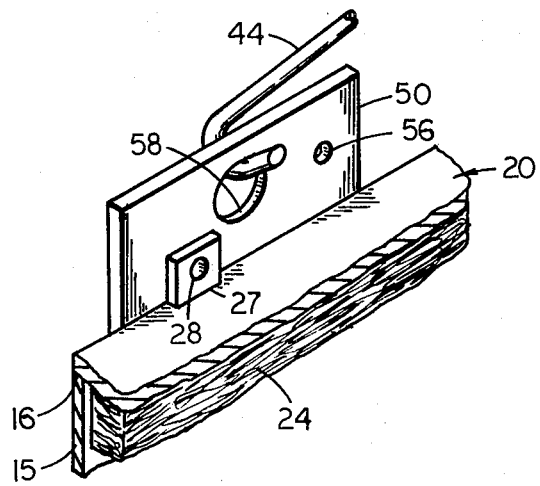
FIG. VI

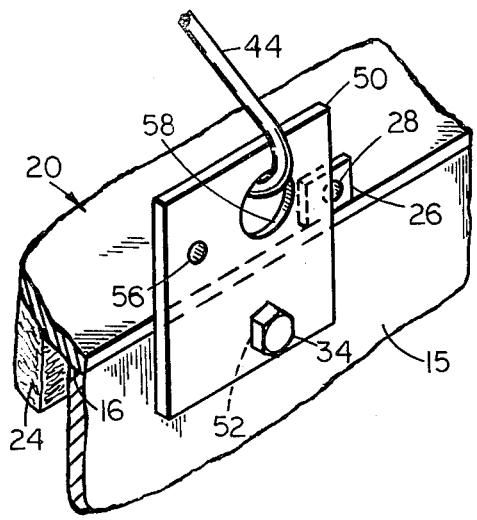
FIG. VII
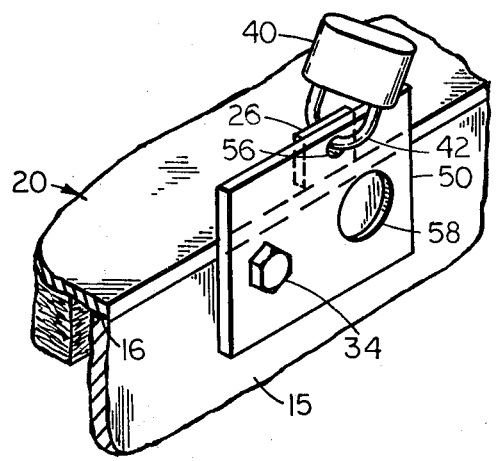
FIG. VIII
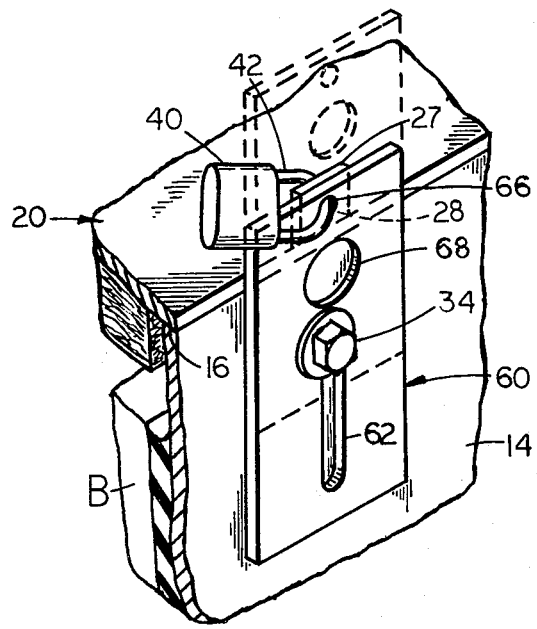
FIG. IX

SAFETY AND LOCKED SPARK PROOF BATTERY BOX

BACKGROUND OF THE INVENTION

Previously industrial battery boxes for trucks having covers and special insulation for use in regions where sparking could cause explosions, have been provided with permanent grapple engaging lugs so that the batteries could be interchanged at will. Thus if a lift truck battery became empty or needed recharging, it could be interchanged with another box of batteries, regardless if they were in a safety box or not.

SUMMARY OF THE INVENTION

Accordingly it is the purpose of this invention to enclose completely and lock a box for industrial batteries to prevent any sparks which may occur inside the box from getting into the atmosphere surrounding the box, as well as to prevent unauthorized personnel from removing the box or changing the battery box with a battery box that is not of the safety type.

Generally speaking, the features of battery box of this invention comprise, an openable top rectangular parallelepiped box, usually made of metal, such as sheet steel, with vertical side and end walls extending from a rectangular steel plate bottom, all welded together at their edges. The upper or top edge of the side and end walls is substantially planar and parallel to the bottom plate. Adjacent the top edge walls and above the top surfaces of the cells of the industrial batteries inside the box, there may be provided apertures for the connecting cables to the terminals of the batteries, and also screened or perforated windows for the escape of gases from the cells inside of the box. The top of the box is provided with a planar cover or lid with its periphery fitting over the upper or top edge of the box in order to close the box. The inside of this lid may be provided with a sponge plastic insulation material to reduce sparking between the terminals of the cells in the box. The lid may be provided with a central hinge, which hinge may be pivoted at its ends on lugs welded to the top edge of opposite sides of the box.

The invention also comprises providing movable lugs at the other two opposite side walls of the box near their top edges, which lugs instead of being fixed with exposed apertures large enough for a grappling hook to engage, are movable so that these apertures may be moved and locked below the top of the box so as not to be engaged by a grapple and the locking thereof simultaneously locks the cover or lid on the box. These movable lugs either may be pivoted centrally so that when the large grappling apertures are swiveled below the top side of the box, smaller apertures extend above the top edge of the box through which the bails of padlocks can be inserted, which bails overlap the cover of the box to prevent it from being opened as well as to prevent the lugs from being swiveled into hook grappling position. If desired, the lids of the box may be provided with cooperating bail engagable apertured lugs to insure locking of the lids. Also if desired, the movable lugs, instead of being pivoted, may be slidable in slots to expose and not expose respectively the larger grapple engaging apertures above the top of the box.

OBJECTS AND ADVANTAGES

Accordingly it is an object of this invention to provide a simple, efficient, effective, and economic safety and locked spark proof battery box which cannot be tampered with by unauthorized personnel or removed from its position.

Another object is to provide such a battery box with relatively movable grapple hook engaging lugs which may be locked out of grapple engaging position and simultaneously lock the lid of the box.

BRIEF DESCRIPTION OF THE VIEWS

The above mentioned and other features, objects and advantages, and a manner of obtaining them are described more specifically below by reference to embodiments of this invention shown in the accompanying drawings, wherein:

FIG. I is a perspective view of the top of a safety and locked spark proof battery box with the lid pivotable lifting lugs locked by padlocks out of lifting or grapple engaging positions, part of the lid broken away to show the batteries;

FIG. II is a perspective view similar to FIG. I, with the lifting lugs unlocked and being engaged by a pair of grapple hooks for lifting of the box;

FIG. III is an enlarged vertical sectional view through a lug and its adjacent side wall and lid of battery box as shown in FIG. I;

FIG. IV is a view similar to FIG. III of an enlarged vertical section of a lug in the box lifting position as shown in FIG. II;

FIG. V is an enlarged perspective view of another embodiment of a pivoted lug for locking the battery box similar to that shown in FIG. 1, without a padlock bail engaging lug on the lid of the box;

FIG. VI is an enlarged perspective view similar to FIG. V of another embodiment of a pivoted lug according to this invention in its grappling position;

FIG. VII is a perspective view similar to FIG. VI but of the other side thereof;

FIG. VIII is a perspective view similar to FIG. VII showing the pivoted lug in its lid locking position with the grapple hole in its non-engageable position; and FIG. IX is a perspective view similar to FIGS. VII and VIII of still another embodiment of this invention in which the movable lug is slidable vertically between its grapple and padlock engaging positions, the grapple engaging position being shown in dotted lines.

DETAILED DESCRIPTION OF THE PREFERRED EMBODIMENTS

In FIGS. I and II there is shown an industrial battery box 10 having a substantially rectangular parallelepiped configuration with a bottom wall 11, side walls 12 and 13, and end walls 14 and 15 integral, sealed or welded together along their abutting edges. All of the walls 12, 13, 14 and 15 have a co-planar upper edge 16 along or near which edge 16 there may be provided perforated apertures or screens 17 for the escape of gases from the batteries B sealed inside the box. Below the edge of this side wall there may also be provided a pair of apertures 18 through which the electrical battery connecting cables 19 extend from this box.

The top of the box may be provided with a cover 20, which herein is shown to have a central hinge 21 with the pivots for the ends thereof engaging opposite lugs 22 and 23 on side walls 12 and 13, respectively, which lugs 22 and 23 may be attached or welded to or be integral with and above top edges of these walls. The peripheral edge of the cover 20 preferably rests on the top edge 16 of the battery box so as to completely close it, and the underside of the cover 20 may be provided with a foam insulation 24 (see FIGS. I, III and IV) to reduce sparking between the terminals of cells of the batteries B sealed inside the box 10. The ends of the cover 20 may be provided, if desired, with upstanding lugs 26 and 27, which may be welded to the top peripheral edge of the covers and which are provided with padlock bail engaging apertures 28.

A primary feature of this invention relates to a pair of movable lugs connected to opposite side walls, such as walls 14 and 15, near the top edges 16 thereof, which in the one embodiment shown in FIGS. I through IV comprises pivoted lugs 30, each of which may be a substantially rectangular steel plate with three longitudinally aligned different sized apertures therein. The central aperture 32 is the pivot and is provided with a pivot pin or bolt 34 fastened to the adjacent end wall 14 or 15 near the top edge thereof. If this pivot is a bolt 34 it may engage a corresponding aperture 32 near the upper edge of the end wall 14 or 15, and may be rigidly or freely rotatably fastened into the wall, such as for example by a cooperating locking nut 35 on the inside of the box 10 so as to prevent the removal of the pivot 34 when the lid 20 is closed. The lugs 30 are freely pivoted around the axis of these pivots or bolts 34, so that the other two apertures 36 and 38 in these lugs may be alternately pivoted above the top edge of cover 20. The distance of these apertures from the central pivotal axis of the bolt 34, however, is different, with the one for the smallest aperture 36 being closer to the axis of the bolt 34 than that of the largest aperture 38, so that the aperture 38 when pivoted into position shown in FIGS. II and IV will extend above the top of the lugs 26 and 27 on the cover 20 for easy engagement by grappling hooks 44. The smaller apertures 36 are alignable with the apertures 28 in the lugs 26 and 27 so that when the box is locked, the bails 42 of the padlocks 40 will extend through these aligned apertures 28 and 36 and prevent the opening of the lid. In the event that lugs 26 and 27 are not provided on the cover 20, as shown in the embodiment of FIG. V, the smaller aperture 36 is so close to the top surface of the adjacent cover 20 that the bail 42 engages the surface and prevents the lug from rotating.

Once the padlock 40 and bail 42 are removed from the aligned apertures 36, the lugs 30 may be readily pivoted into the positions shown in FIGS. II and IV so that their larger grapple hook engaging apertures 38 extend above the top surface of the cover, and also above the lugs 26 and 27, if any, for ready engagement by the grapple lifting hooks 44 connected to a hoisting cable or chain assembly 46 (see FIG. II) by which the box 10 can readily be removed from and another box replaced in the industrial machine or truck in which it is employed. However, if unauthorized personnel wishes to change the battery box 10 when the box is locked in a position as shown in FIGS. I and III, the lugs 30 cannot be rotated so that the grappling hooks 44 can be engaged, and the box 10 is so heavy it cannot be removed from the industrial machine or truck without a hoist and grapple. Thus, before a safety closed battery box 10 can be replaced, the person who has the key to the locks 40 must be present to be sure that a similar safety battery box is reinserted into the truck.

Referring now to the embodiment shown in FIGS. VI, VII and VIII, the lugs 50 are shown to have their apertures 52, 56 and 58, corresponding respectively to apertures 32, 36 and 38 of the pivoted lugs 30 described above, in different locations on the rectangular plates 50. These plates 50 may be smaller in size than plates of lugs 30, and when the grapple hook is engaging the aperture 58, it is vertically above the pivot aperture 52, while the smaller padlock engaging aperture 56 is offset therefrom and on the other side of plate 50 from the offset lugs 26 and 27 on the lid 20 with which it can be locked. Thus when the battery box 10 can be removed the grapple engaging apertures 58 are shown in the position as in FIGS. VI and VII, and when the box is locked closed and cannot be grappled, the apertures 58 are in the position shown in FIG. VIII, below the top edge of the cover 20 for the box while the offset smaller apertures 56 are aligned with the holes 28 in the lugs 26 and 27 so that the bails 42 of padlocks 40 may be inserted through them also locking the cover 20. In this embodiment, however, lugs 26 and 27 on the cover are required and cannot be eliminated as in the embodiment shown in FIG. V.

Referring now to the embodiment shown in FIG. IX, the movable lug 60 is vertically slidable and its three apertures 62, 66 and 68 also are vertically aligned as in the lugs 30, but in a different functional order. The lower aperture 62 is a vertically aligned slot into which the bolt 34 slides and anchors the lug 60 to the side of the box. The grapple hook engaging aperture 68 is next and is central of the plate 60 with the smallest padlock bail engaging aperture 66 at the top aligned with the aperture 28 in the lug 26 or 27 on the lid when in locked position as shown in full lines in FIG. IX. When the lug 60 is in the dotted line position shown in FIG. IX, grapple engaging aperture 68 extends above the top of lug 26 or 27 so as to be readily engaged by the grapple hook 44 and the bolt 34 is then at the other and lower end of the slot 62. In this embodiment lugs 26 and 27 must also be provided on top of the lid 20 to prevent vertical movement of the lug plates 60 when the bail 42 of the padlock 40 extends through the apertures 28 in these lugs and the smaller apertures 66 in the plates 60.

Although there are disclosed several different embodiments of this invention, it is to be understood that other combinations of lugs and apertures producing pivoted and/or sliding movements may be provided without departing from the scope of this invention, provided these lugs have the dual function of both locking the box as well as preventing its unauthorized movement by the exposure of its grapple engaging apertures.

While there is described above the principles of this invention in connection with specific apparatus, it is to be clearly understood that this description is made only by way of example and not as a limitation to the scope of this invention.

I claim:

1. A safety and lockable battery box comprising:
    A. an open top box having four side walls with a substantially planar top edge,
    B. a removable cover for closing said box, the pheriphery of which cover engages said top edge of said side walls, and
    C. a pair of movable lugs attached to an opposite pair of side walls near their top edges, said lugs having three apertures therein:
        a. a first for movable attachment to said side walls, b. a second for engagement with a grappling hook for lifting the box, which aperture is movable above and below the top edge of said side walls for engagement and non-engagement by a grappling hook, respectively, and c. a third aperture smaller than that for said grappling hook for movement above the top of said side walls for the bail of a padlock for locking said cover on said box and maintaining said second aperture below said top edge of said side walls.

2. A battery box according to claim 1 containing industrial batteries.

3. A battery box according to claim 1 having a rectangular parallelepiped configuration.

4. A battery box according to claim 1 including breather holes near the top edge of at least of one said walls.

5. A battery box according to claim 1 including a cable aperture near the top edge of one of said walls for an electrical cable to the batteries in said box.

6. A battery box according to claim 1 wherein said cover is hinged centrally thereof, and opposite side walls are provided with lugs for pivoting the ends of said hinge.

7. A battery box according to claim 1 wherein said cover includes foam insulation on its inner side to prevent sparking between terminals of the cells of the batteries in said box.

8. A battery box according to claim 1 wherein said apertures in said lugs are vertically aligned.

9. A battery box according to claim 8 wherein said first aperture is centrally of said aligned apertures.

10. A battery box according to claim 8 wherein said first aperture comprises a slot, and is at one end of said aligned apertures.

11. A battery box according to claim 1 wherein said first and second apertures are vertically alignable and said third aperture is offset therefrom.

12. A battery box according to claim 1 wherein said movable lugs are pivotally connected to said box.

13. A battery box according to claim 1 wherein said movable lugs are slidably connected to the walls of said battery box.

* * * * *

UNITED STATES PATENT OFFICE
CERTIFICATE OF CORRECTION

Patent No. 3,904,439  Dated Sept. 9, 1975

Inventor(s) James H. BARRETT, JR.

It is certified that error appears in the above-identified patent and that said Letters Patent are hereby corrected as shown below:

Column 1, line 59 change "engagable" to - - engageable - - .

Column 4, line 61 change "phe-" to - - pe-  - - .

Column 5, line 17 change "of one" to - - one of - -.

Signed and Sealed this twenty-third Day of December 1975

[SEAL]

Attest:

RUTH C. MASON
Attesting Officer

C. MARSHALL DANN
Commissioner of Patents and Trademarks